(12) United States Patent
Shi et al.

(10) Patent No.: US 11,237,046 B2
(45) Date of Patent: Feb. 1, 2022

(54) PHOTOELECTRIC DETECTION CIRCUIT COMPRISING A FIRST PHOTOELECTRIC SENSING ELEMENT FOR OPTICAL SIGNAL DETECTION AND A SECOND PHOTOSENSING ELEMENT WITH A LIGHT SHIELD

(71) Applicant: BOE TECHNOLOGY GROUP CO., LTD., Beijing (CN)

(72) Inventors: Yongming Shi, Beijing (CN); Zhanjie Ma, Beijing (CN); Hui Tian, Beijing (CN); Chun Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 810 days.

(21) Appl. No.: 16/072,373

(22) PCT Filed: Dec. 6, 2017

(86) PCT No.: PCT/CN2017/114805
§ 371 (c)(1),
(2) Date: Jul. 24, 2018

(87) PCT Pub. No.: WO2018/223634
PCT Pub. Date: Dec. 13, 2018

(65) Prior Publication Data
US 2021/0207993 A1    Jul. 8, 2021

(30) Foreign Application Priority Data

Jun. 5, 2017  (CN) .......................... 201710414695.1

(51) Int. Cl.
*G01J 1/42*  (2006.01)
*G01J 1/02*  (2006.01)
(Continued)

(52) U.S. Cl.
CPC ........... *G01J 1/4228* (2013.01); *G01J 1/0295* (2013.01); *G01J 1/44* (2013.01); *G01J 1/46* (2013.01);
(Continued)

(58) Field of Classification Search
CPC .......... G01J 1/4228; G01J 1/46; G01J 1/0295; G01J 1/44; G01J 2001/446; G01T 1/2018
See application file for complete search history.

(56) References Cited

U.S. PATENT DOCUMENTS 6,064,069 A * 5/2000 Nakano ............. H01L 27/14625
250/370.08
2005/0218302 A1* 10/2005 Shin .................... G02F 1/13318
250/214 R
(Continued)

FOREIGN PATENT DOCUMENTS

CN        101276827 A      10/2008
CN        101639381 A       2/2010
(Continued)

OTHER PUBLICATIONS

International Search Report of PCT/CN2017/114805 in Chinese, dated Feb. 24, 2018 with English translation.
(Continued)

*Primary Examiner* — Jennifer D Bennett
(74) *Attorney, Agent, or Firm* — Collard & Roe, P.C.

(57) ABSTRACT

A photoelectric detection circuit and a photoelectric detector are provided. The photoelectric detection circuit includes a first sub-circuit and a second sub-circuit. The first sub-circuit includes a first photoelectric sensing element, and the second sub-circuit includes a second photoelectric sensing element, and an electrical characteristic of the first photoelectric sensing element is substantially identical to an electrical characteristic of the second photoelectric sensing
(Continued)

element, and the second photoelectric sensing element is shielded to prevent light from being incident on the second photoelectric sensing element.

15 Claims, 5 Drawing Sheets (51) Int. Cl.
 G01J 1/44 (2006.01)
 G01J 1/46 (2006.01)
 G01T 1/20 (2006.01)
(52) U.S. Cl.
 CPC ....... *G01T 1/2018* (2013.01); *G01J 2001/446* (2013.01)

(56) References Cited

U.S. PATENT DOCUMENTS

| | | | | |
|---|---|---|---|---|
| 2007/0278388 A1* | 12/2007 | Hirose | ...................... | G01J 1/44 250/214 R |
| 2008/0239321 A1* | 10/2008 | Chen | ..................... | G01N 21/251 356/406 |
| 2010/0141935 A1* | 6/2010 | Chiba | ................... | G01J 1/0228 356/218 |
| 2016/0223884 A1 | 8/2016 | Kususaki | | |
| 2017/0365224 A1* | 12/2017 | Okamoto | ............. | G09G 3/3426 |
| 2018/0098701 A1* | 4/2018 | Blomqvist | ......... | A61B 5/02438 |

FOREIGN PATENT DOCUMENTS

| | | |
|---|---|---|
| CN | 101769791 A | 7/2010 |
| CN | 101806619 A | 8/2010 |
| CN | 106525233 A | 3/2017 |

OTHER PUBLICATIONS

Notice of Transmittal of the International Search Report of PCT/CN2017/114805 in Chinese, dated Feb. 24, 2018.

Written Opinion of the International Searching Authority of PCT/CN2017/114805 in Chinese, dated Feb. 24, 2018 with English translation.

* cited by examiner

FIG. 6

PHOTOELECTRIC DETECTION CIRCUIT COMPRISING A FIRST PHOTOELECTRIC SENSING ELEMENT FOR OPTICAL SIGNAL DETECTION AND A SECOND PHOTOSENSING ELEMENT WITH A LIGHT SHIELD

CROSS-REFERENCE TO RELATED APPLICATION

This application is the National Stage of PCT/CN2017/114805 filed on Dec. 6, 2017, which claims priority under 35 U.S.C. § 119 of Chinese Application No. 201710414695.1 filed on Jun. 5, 2017, the disclosure of which is incorporated by reference.

TECHNICAL FIELD

Embodiments of the present disclosure provide a photoelectric detection circuit and a photoelectric detector.

BACKGROUND

Photoelectric detection technology is a technique for detecting and recognizing objects according to light waves radiated or reflected by the detected objects, and has the advantages of high accuracy, high speed, long detection distance, large information capacity, strong anti-interference ability, non-contact detection, being easy to realize automation, intelligence, etc.. According to the wavelength range of detection light, photoelectric detection technology can be divided into ultraviolet light detection technology, visible light detection technology, X-ray detection technology, infrared light detection technology, etc..

Photoelectric detection technology is widely used in various fields such as military, economics, medicine, environmental sciences, and so on. For example, X-ray detection technology can be applied to disease diagnosis, treatment, etc.; infrared light detection technology can be applied to infrared detection, night vision, infrared stealth, infrared guidance, infrared remote sensing, etc.; and visible light detection technology can be applied to monitoring, video doorbell, photometric measurement, etc..

SUMMARY

At least one embodiment of the present disclosure provides a photoelectric detection circuit, which comprises a first sub-circuit and a second sub-circuit. The first sub-circuit comprises a first photoelectric sensing element, and the second sub-circuit comprises a second photoelectric sensing element, and an electrical characteristic of the first photoelectric sensing element is substantially identical to an electrical characteristic of the second photoelectric sensing element, and the second photoelectric sensing element is shielded to prevent light from being incident on the second photoelectric sensing element.

For example, the photoelectric detection circuit provided by at least one embodiment of the present disclosure, further comprises a difference circuit coupled to the first sub-circuit and the second sub-circuit, and the difference circuit is configured to perform a difference processing on a first output signal output by the first sub-circuit and a second output signal output by the second sub-circuit corresponding to each other.

For example, the photoelectric detection circuit provided by at least one embodiment of the present disclosure further comprises an amplification circuit coupled to the difference circuit, and the difference circuit is further configured to output a difference signal, and the amplification circuit is configured to receive the difference signal and perform an amplification processing on the difference signal.

For example, in the photoelectric detection circuit provided by at least one embodiment of the present disclosure, the second photoelectric sensing element is shielded to prevent light of a wavelength at least in a detection wavelength band of the second photoelectric sensing element from being incident on the second photoelectric sensing element.

For example, in the photoelectric detection circuit provided by at least one embodiment of the present disclosure, the first sub-circuit further comprises a first switching element and a first storage capacitor, and the first switching element is configured to control and output a first electrical signal generated by the first photoelectric sensing element, and the first storage capacitor is configured to store the first electrical signal, and the second sub-circuit further comprises a second switching element and a second storage capacitor, and the second switching element is configured to control and output a second electrical signal generated by the second photoelectric sensing element, and the second storage capacitor is configured to store the second electrical signal.

For example, the photoelectric detection circuit provided by at least one embodiment of the present disclosure further comprises a first power terminal and a second power terminal. A first terminal of the first photoelectric sensing element is electrically connected to the first power terminal, and a second terminal of the first photoelectric sensing element is electrically connected to a first terminal of the first switching element, and a control terminal of the first switching element is configured to receive a control signal, and a second terminal of the first switching element is electrically connected to a first terminal of the first storage capacitor, and a second terminal of the first storage capacitor is electrically connected to the second power terminal; a first terminal of the second photoelectric sensing element is electrically connected to the first power terminal, and a second terminal of the second photoelectric sensing element is electrically connected to a first terminal of the second switching element, and a control terminal of the second switching element is configured to receive the control signal, and a second terminal of the second switching element is electrically connected to a first terminal of the second storage capacitor, and a second terminal of the second storage capacitor is electrically connected to the second power terminal.

For example, in the photoelectric detection circuit provided by at least one embodiment of the present disclosure, the first terminal of the first photoelectric sensing element is a positive terminal, and the second terminal of the first photoelectric sensing element is a negative terminal, and the first terminal of the second photoelectric sensing element is a positive terminal, and the second terminal of the second photoelectric sensing element is a negative terminal, and an output voltage of the first power terminal is higher than an output voltage of the second power terminal.

For example, in the photoelectric detection circuit provided by at least one embodiment of the present disclosure, an electrical characteristic of the first switching element is substantially identical to an electrical characteristic of the second switching element, and an electrical characteristic of the first storage capacitor is substantially identical to an electrical characteristic of the second storage capacitor.

For example, in the photoelectric detection circuit provided by at least one embodiment of the present disclosure, the first photoelectric sensing element comprises a photodiode, and the second photoelectric sensing element comprises a photodiode.

For example, in the photoelectric detection circuit provided by at least one embodiment of the present disclosure, the first sub-circuit further comprises a wavelength conversion element, and the wavelength conversion element is configured to convert incident light into the light of the wavelength in a detection wavelength band of the first photoelectric sensing element.

For example, in the photoelectric detection circuit provided by at least one embodiment of the present disclosure, the first sub-circuit and the second sub-circuit are provided on a same layer.

For example, the photoelectric detection circuit provided by at least one embodiment of the present disclosure further comprises a shading element. The shading element covers the second photoelectric sensing element so that the light incident on the second photoelectric sensing element is shielded.

For example, in the photoelectric detection circuit provided by at least one embodiment of the present disclosure, the second photoelectric sensing element is shielded by the first photoelectric sensing element to prevent the light from being incident on the second photoelectric sensing element.

For example, the photoelectric detection circuit provided by at least one embodiment of the present disclosure further comprises a shading element. The first sub-circuit is stacked with the second sub-circuit, and the first sub-circuit is above the second sub-circuit, and the shading element is located between the first sub-circuit and the second sub-circuit, and covers the second photoelectric sensing element so that the light incident on the second photoelectric sensing element is shielded.

At least one embodiment of the present disclosure also provides a photoelectric detector comprising at least one photoelectric detection circuit as described in any of the above embodiments.

For example, in the photoelectric detector provided by at least one embodiment of the present disclosure, the first sub-circuit and the second sub-circuit are provided on a same layer.

For example, the photoelectric detector provided by at least one embodiment of the present disclosure further comprises a shading element. The shading element covers the second photoelectric sensing element so that the light incident on the second photoelectric sensing element is shielded.

For example, in the photoelectric detector provided by at least one embodiment of the present disclosure, the first sub-circuit is stacked with the second sub-circuit, and the first sub-circuit is above the second sub-circuit, and so that the light incident on the second photoelectric sensing element is shielded by the first sub-circuit.

For example, the photoelectric detector provided by at least one embodiment of the present disclosure further comprises a shading element. The first sub-circuit is stacked with the second sub-circuit, and the first sub-circuit is above the second sub-circuit, and the shading element is located between the first sub-circuit and the second sub-circuit, and covers the second photoelectric sensing element so that the light incident on the second photoelectric sensing element is shielded.

BRIEF DESCRIPTION OF THE DRAWINGS

In order to clearly illustrate the technical solution of the embodiments of the present disclosure, the embodiments or the drawings of the related technical description will be briefly described in the following, it is obvious that the described drawings are only related to some embodiments of the present disclosure and thus are not limitative of the present disclosure.

DETAILED DESCRIPTION

In order to make objects, technical details and advantages of the embodiments of the invention apparent, the technical solutions of the embodiments will be described in a clearly and fully understandable way in connection with the drawings related to the embodiments of the invention. Apparently, the described embodiments are just a part but not all of the embodiments of the invention. Based on the described embodiments herein, those skilled in the art can obtain other embodiment(s), without any inventive work, which should be within the scope of the invention.

Unless otherwise defined, all the technical and scientific terms used herein have the same meanings as commonly understood by one of ordinary skill in the art to which the present invention belongs. The terms "first," "second," etc., which are used in the description and the claims of the present application for invention, are not intended to indicate any sequence, amount or importance, but distinguish various components. Also, the terms such as "a," "an," etc., are not intended to limit the amount, but indicate the existence of at least one. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but can include an electrical connection, directly or indirectly. "On," "under," "right," "left" and the like are only used to indicate relative position relationship, and when the position of the object which is described is changed, the relative position relationship can be changed accordingly.

In order to keep the following description of the embodiments of the present disclosure clear and concise, detailed descriptions of known functions and known components are omitted in the present disclosure.

With the development of science and technology, photoelectric detection technology has become more and more widely used in the medicine, agriculture, electronics, aerospace technology and other fields. For example, X-ray detection technology can convert invisible X-rays to visible light, and then the visible light is received by photodiodes and converted into an electrical signal, which is easily measured, by the photovoltaic effect, thereby implementing a detection function. In the medical field, X-ray detection technology can be applied to computerized tomography to examine a variety of diseases.

An X-ray detector is a photoelectric detector using an amorphous silicon photodiode array as its core, and comprises an array substrate comprising an X-ray conversion layer and a detection array composed of a plurality of detection units, and each of detection units comprises a thin film transistor (TFT, Thin Film Transistor) and a photodiode, for example. When X-rays are incident on the array substrate, the X-ray conversion layer converts the X-rays into visible light, and then the visible light is converted into electrical signals by the photodiode and stored, and then thin film transistors are turned on row by row under the control of a driving circuit, and the electronic charges converted by the photodiode is transmitted to a data processing circuit through the thin film transistor, and the data processing circuit conducts further processes on the charge signal for amplification, analog-to-digital conversion, etc., and a detection image information is obtained finally.

The detection circuit of the X-ray detector can comprise two types, i.e., active type and passive type. A passive photoelectric detection circuit directly outputs and detects the photoelectric signal generated by a photoelectric sensing element; and an active photoelectric detection circuit amplifies the photoelectric signal generated by a photoelectric sensing element firstly, and then outputs and detects the amplified photoelectric signal.

Figure 1A:
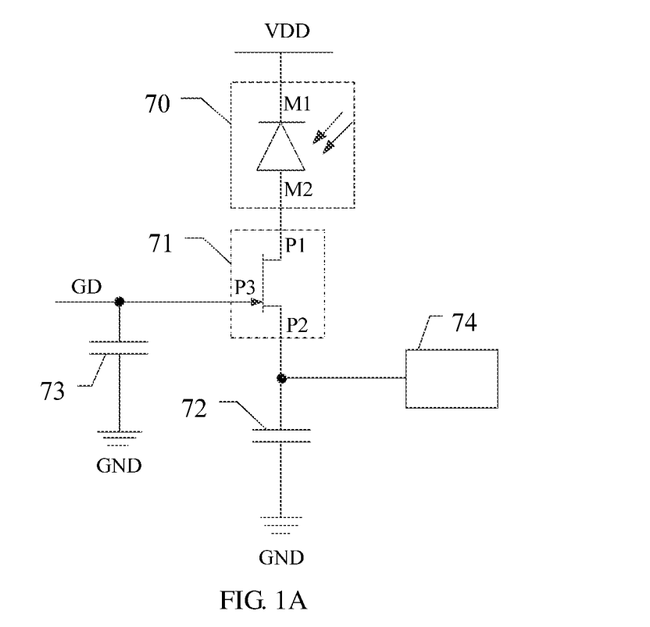
FIG. 1A is a schematic structural diagram of a passive photoelectric detection circuit.

Among techniques known to inventors, FIG. 1A shows a schematic structure diagram of a passive photoelectric detector circuit. For example, as shown in FIG. 1A, the detection circuit comprises a photodiode 70, a transistor 71, a charge storage capacitor 72, a gate storage capacitor 73, and a charge amplifier 74. The photodiode 70 is configured to convert an optical signal into an electrical signal, and the transistor 71 is configured to control transferring of the electrical signal generated by the photodiode 70 to the charge storage capacitor 72, and the charge storage capacitor 72 is configured to store the electrical signal generated by the photodiode 70, and the gate storage capacitor 73 is configured to maintain the voltage signal of a control terminal P3 of the transistor 71.

For example, a power voltage terminal VDD outputs a positive voltage, a first terminal M1 of the photodiode 70 is electrically connected to the power voltage terminal VDD, and a second terminal M2 of the photodiode is electrically connected to a first terminal P1 of the transistor 71; the control terminal P3 of the transistor 71 is electrically connected to a first terminal of the gate storage capacitor 73 and is configured to receive a control signal, and a second terminal P2 of the transistor 71 is electrically connected to a first terminal of the charge storage capacitor 72; a second terminal of the charge storage capacitor 72 can be electrically connected to the ground GND, and a second terminal of the gate storage capacitor 73 can also be electrically connected to the ground GND.

When the photoelectric detector operates, the photodiode 70 is irradiated by light and generates optical-generated charges corresponding to the intensity of the light signal, and the optical-generated charges can be directionally moved under the control of the voltage between the power voltage terminal VDD and the ground GND. When the control terminal P3 of the transistor 71 receives a turn-on signal GD, the transistor 71 is turned on, so the optical-generated charges can be transmitted by the transistor 71 to the charge storage capacitor 72, and stored by the charge storage capacitor 72, and then transmitted to the charge amplifier 74 for further processing, and detected, and an image information can be formed finally.

Figure 1B:
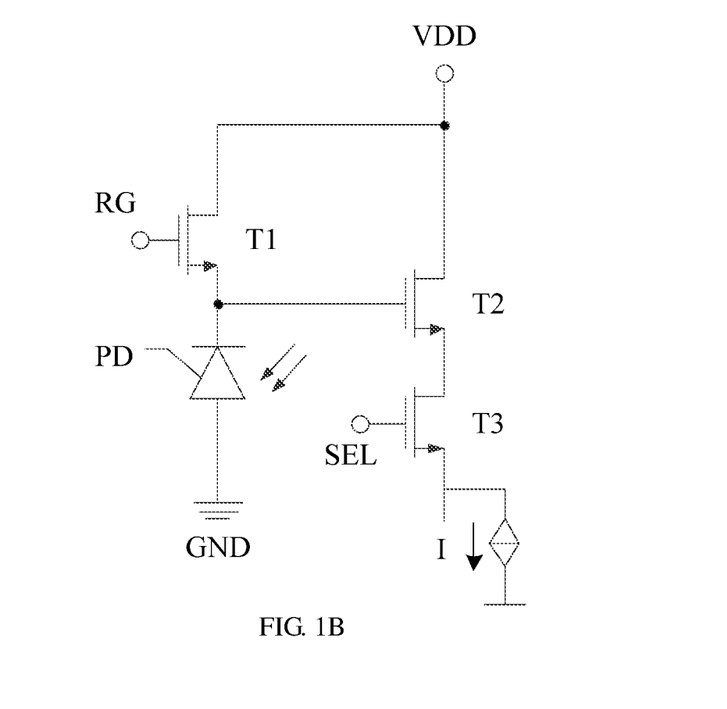
FIG. 1B is a schematic structural diagram of an active photoelectric detection circuit.

Among the techniques known to the inventors, FIG. 1B shows a schematic structure diagram of an active photoelectric detection circuit. For example, as shown in FIG. 1B, the active photoelectric detection circuit comprises a photodiode PD, a reset transistor T1, a source follower transistor T2, and a selection transistor T3. The optical-generated charges generated and collected by the photodiode PD is sensed under the control of the three MOS transistors. The specific detection process of the active photoelectric detection circuit can comprise: in a reset stage, a control terminal of the reset transistor T1 receives a reset signal RG, and the reset transistor T1 is turned on and the photodiode PD is reset instantaneously; in an optical sensing accumulation stage, the reset signal RG is turned off, and the reset transistor T1 is turned off, and the photodiode PD responds to the incident light to generate an electron-hole pair (EHP) when light is incident on the photodiode PD. In a signal amplification stage, the charge accumulated (or stored) in the photodiode PD is transmitted to the source follower transistor T2, and the source follower transistor T2 amplifies the photoelectric signal output by the photodiode PD. In an output stage, a control terminal of the selection transistor T3 receives a selection enable signal SEL, so that the selection transistor T3 is turned on, and an amplified photoelectric signal I is output, and then the amplified photoelectric signal I is further processed such as amplification, analog/digital conversion, and the like, and detected, and the image information is formed finally.

For example, as shown in FIG. 1A, in practical applications, in order to increase the resolution of the photoelectric detector, a higher voltage needs to be applied across the photodiode 70. For example, a positive high voltage is applied to the power voltage terminal VDD. Because of the presence of the high voltage, even in the absence of light, a very few of carriers in the photodiode 70 may generate a directional drift motion, thereby forming a dark current, and the dark current is also stored in the charge storage capacitor 72. Thus, the amount of charges Q stored in the charge storage capacitor 72 can be expressed by the following equation:

$$Q = f1 + f2$$

where f1 is a function of the amount of the charges generated by the photodiode 70 with respect to light, that is, f1 involves optical-generated charges that need to be detected; f2 is a function of the amount of the charges with respect to the applied voltage, and f2 represents the charge generated by the dark current caused by the high voltage of the electronic component(s) in the circuit structure, and the dark current is independent of the optical-generated charges that need to be detected and therefore is a noise signal. Due to the existence of this dark current, there is a difference between the detected charge signal and the optical-generated charge signal actually generated by the photodiode 70, and this difference affects the detection accuracy and even causes detection error or errors.

At least one embodiment of the present disclosure provides a photoelectric detection circuit and a photoelectric detector. The photoelectric detection circuit comprises a first sub-circuit and a second sub-circuit. The first sub-circuit comprises a first photoelectric sensing element, the second sub-circuit comprises a second photoelectric sensing element, and an electrical characteristic of the first photoelectric sensing element is substantially identical to an electrical characteristic of the second photoelectric sensing element, and the second photoelectric sensing element is shielded to prevent light from being incident on the second photoelectric sensing element. Thus, the photoelectric detection circuit outputs a dark current through the second sub-circuit, and then performs a difference process between the dark current and a current signal output by the first sub-circuit, and therefore, the dark current noise of the photoelectric detection circuit can be eliminated, and the signal-to-noise ratio can be increased, and the detection accuracy can be improved.

In the following, a passive photoelectric detection circuit taken as an example is described in the embodiment of the present disclosure, and those skilled in the art should understand that the photoelectric detection circuit provided by the present disclosure can also be an active photoelectric detection circuit, and the embodiment of the present disclosure is not limited in this aspect.

In the following description of the present disclosure, the phrase "electrical characteristics are substantially identical" indicates that electrical characteristics of the electronic component of the same type are the same or substantially the same at the same voltage. For example, when the material, bulk, size, manufacturing process conditions, and the like of the electronic components of the same type are the same, the electronic components of the same type have substantially the same electrical characteristics at the same voltage. The phrase "same voltage" means that the voltage values are exactly equal or substantially equal. The description such as the substantially same, the substantially equal, etc., indicating that if there is a difference between the two voltage values, the difference with respect to the larger one is, for example, no more than 10%, for example, no more than 5%.

Several embodiments of the present disclosure will be described in detail below, but the present disclosure is not limited to these specific embodiments.

Figure 2A:
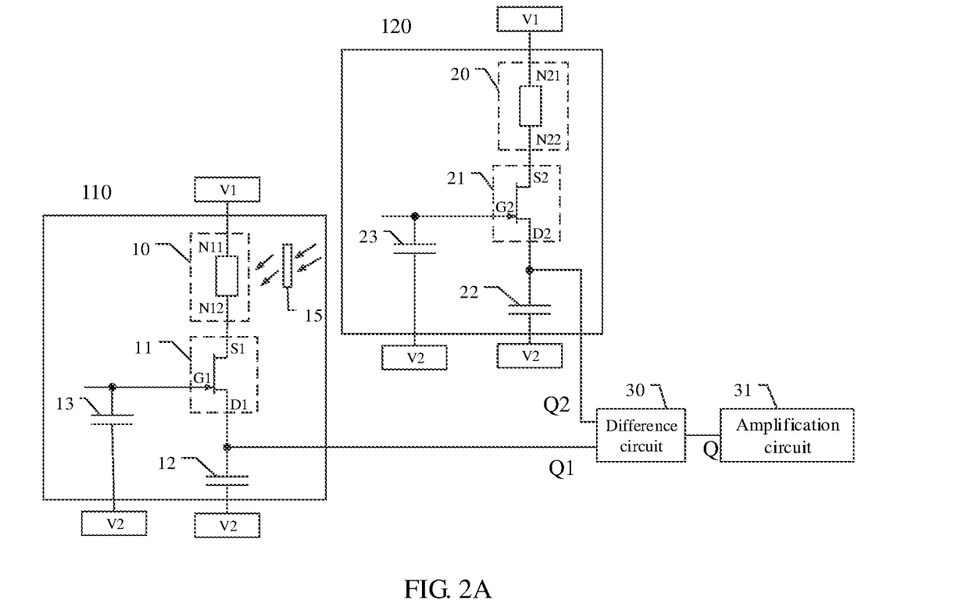
FIG. 2A is a schematic structural diagram of a photoelectric detection circuit provided by an embodiment of the present disclosure.
Figure 2B:
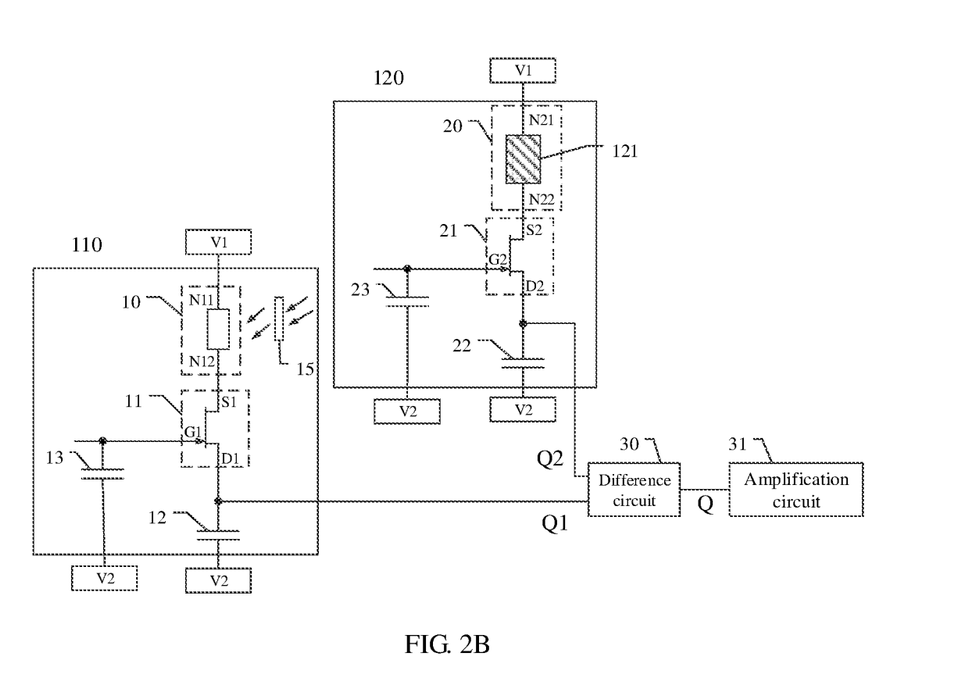
FIG. 2B is a schematic structural diagram of another photoelectric detection circuit provided by an embodiment of the present disclosure.

An embodiment of the present disclosure provides a photoelectric detection circuit. FIG. 2A shows a schematic structure diagram of a photoelectric detection circuit provided by an embodiment of the present disclosure. FIG. 2B shows a schematic structure diagram of another photoelectric detection circuit provided by an embodiment of the present disclosure.

For example, as shown in FIG. 2A, the photoelectric detection circuit comprises a first sub-circuit 110 and a second sub-circuit 120. The first sub-circuit 110 comprises a first photoelectric sensing element 10, and the second sub-circuit 120 comprises a second photoelectric sensing element 20, and an electrical characteristic of the first photoelectric sensing element 10 is substantially identical to an electrical characteristic of the second photoelectric sensing element 20, and the second photoelectric sensing element 20 is shielded to prevent light from being incident on the second photoelectric sensing element 20.

For example, the photoelectric detection circuit provided by an embodiment of the present disclosure can comprise one first sub-circuit and a plurality of second sub-circuits, that is, one first sub-circuit can correspond to the plurality of second sub-circuits. For example, dark currents output from the plurality of second sub-circuits may be averaged to more accurately evaluate the dark currents. For another example, a plurality of photoelectric detection circuits can be arranged in an array, and each of photoelectric detection circuits comprises a first sub-circuit, and at least two photoelectric circuits comprise a second sub-circuit, that is, at least two first sub-circuits correspond to one second sub-circuit, so that the area occupied by the second sub-circuit in the array formed by the photoelectric detection circuits can be reduced.

For example, the first photoelectric sensing element 10 is configured to respond to incident light to generate a detection charge signal; the second photoelectric sensing element 20 is configured to output a dark current signal.

For example, a shading processing may be performed with respect to the prepared second photoelectric sensing element 20 during the process of fabricating the photoelectric detection circuit; or, a shading processing may be performed upon the photosensitive surface of the second photoelectric sensing element 20 during the process of fabricating the second photoelectric sensing element 20.

For example, in one example, the second photoelectric sensing element 20 may be shielded by the first photoelectric sensing element 10 to prevent light from being incident on the second photoelectric sensing element 20. For example, the photosensitive surface of the second photoelectric sensing element 20 may be shielded by the first photoelectric sensing element 10 to prevent light from being incident on the photosensitive surface of the second photoelectric sensing element 20.

For example, as shown in FIG. 2B, in another example, the photoelectric detection circuit may further comprise a shading element 121, and the shading element 121 is configured to shield the light incident on the second photoelectric sensing element 20. For example, the first sub-circuit 110 and the second sub-circuit 120 may be provided on a same layer. The shading element 121 may be above the second sub-circuit 120 and cover at least the photosensitive surface of the second photoelectric sensing element 20 to shield the light incident on the second photoelectric sensing element 20, thereby preventing light from being incident on the photosensitive surface of the second photoelectric sensing element 20. For another example, the first sub-circuit 110 is stacked with the second sub-circuit 120, and the first sub-circuit 110 is above the second sub-circuit 120. The shading element 121 may be located between the first sub-circuit 110 and the second sub-circuit 120, and covers the second photoelectric sensing element 20 to shield the light incident on the second photoelectric sensing element 20.

For example, the shading element 121 may cover all the elements of the second sub-circuit 120; or, the shading element 121 may cover only the photosensitive surface of the second photoelectric sensing element 20 of the second sub-circuit 120 as long as the shading element 121 can shield light from being incident on the photosensitive surface of the second photoelectric sensing element 20. The embodiment(s) of the present disclosure is not limited in this aspect.

For example, the shading element 121 may comprise a shading layer. The material of the shading layer may be, for example, an opaque material. The opaque material may be a metal material. For example, the metal material may comprise Mo, Cu, Al, Zn, and the like. The opaque material may also be a non-metal material. For example, the non-metal material may comprise a propylene resin mixed with a black pigment (e.g., carbon), and the like.

For example, the second photoelectric sensing element 20 is shielded to prevent light of the wavelength at least in a detection wavelength band of the second photoelectric sensing element 20 from being incident on the second photoelectric sensing element 20. For example, the shading element 121 may further comprise a light filter. The light filter can filter the light of the wavelength in the detection wavelength band of the second photoelectric sensing element 20. According to the range of the response wavelength (i.e., the wavelength of the light in the detection wavelength band) of the second photoelectric sensing element 20, the shading element 121 may comprise light filters of different type, for example, a visible light filter, an ultraviolet filter, an infrared filter, etc..

For example, the first photoelectric sensing element 10 can be the same as the second photoelectric sensing element 20, but it is not required that both are exactly the same. For example, both can be substantially the same. For example, the first photoelectric sensing element 10 and the second photoelectric sensing element 20 can use the same material and can be formed on substantially the same manufacturing process conditions; also, both also have the same size and so on. Thus, the first photoelectric sensing element 10 and the second photoelectric sensing element 20 have substantially the same dark current at the same voltage. It should be noted that there can also be some differences between the first photoelectric sensing element 10 and the second photoelectric sensing element 20, as long as it is ensured that the electrical characteristic of the first photoelectric sensing element 10 is substantially identical to the electrical characteristic of the second photoelectric sensing element 20 at the same voltage. For example, at the same voltage, the dark current generated by the first photoelectric sensing element 10 is substantially identical to the dark current generated by the second photoelectric sensing element 20.

For example, the first photoelectric sensing element 10 can comprise a photodiode, and the second photoelectric sensing element 20 may also comprises a photodiode. The photodiode may comprise, for example, a PN junction photodiode, a PIN junction photodiode, an avalanche photodiode, a Schottky type photodiode, and the like. The manufacturing materials of the photodiode may comprise photoelectric conversion materials such as amorphous silicon (a-Si), germanium (Ge), gallium arsenide (GaInAs), cadmium sulfide (Cds), cadmium selenide (CdSe), cadmium telluride (CdTe), lead sulfide (PbS), and mercury cadmium telluride (HgCdTe) and the like.

It should be noted that the type of the first photoelectric sensing element 10 and the type of the second photoelectric sensing element 20 are not limited to photodiodes, and can also be other suitable devices. For example, the other suitable devices can be photovoltaic detectors such as electrical contact photodiodes of metal-oxide-metal structures, photoelectric transistors, and so on.

For example, as shown in FIG. 2A, the first sub-circuit 110 further comprises a first switching element 11 and a first storage capacitor 12, and the second sub-circuit 120 also comprises a second switching element 21 and a second storage capacitor 22. The first switching element 11 is configured to control and output a first electrical signal generated by the first photoelectric sensing element 10, and the first storage capacitor 12 is configured to store the first electrical signal. The second switching element 21 is configured to control and output a second electrical signal generated by the second photoelectric sensing element 20, and the second storage capacitor 22 is configured to store the second electrical signal.

For example, the first storage capacitor 12 may also store dark current signals generated by other electronic components of the first sub-circuit 110; and the second storage capacitor 22 may also store the dark current signals generated by other electronic components of the second sub-circuit 120.

For example, an electrical characteristic of the first switching element 11 is substantially identical to an electrical characteristic of the second switching element 21, and an electrical characteristic of the first storage capacitor 12 is substantially identical to an electrical characteristic of the second storage capacitor 22. For example, for the first switching element 11 and the second switching element 21, the electrical characteristics thereof may comprise one or more of current amplification factor, dark current, frequency characteristics, maximum reverse voltage, reverse current, and the like; for the first storage capacitor 12 and the second storage capacitor 22, the electrical characteristics may comprise one or more of dielectric loss, nominal capacitance, dark current, rated operating voltage, insulation resistance between two electrodes, and the like.

For example, the first storage capacitor 12 and the second storage capacitor 22 may be fixed capacitors, variable capacitors or trim capacitors. For example, it may be an aluminum electrolytic capacitor, a tantalum electrolytic capacitor, a polyester film capacitor, a ceramic capacitor, a polystyrene capacitor, or the like.

For example, the first switching element 11 and the second switching element 21 can be transistors such as MOS transistors or thin film transistors (TFTs). The thin film transistor can comprise, for example, an oxide thin film transistor, an amorphous silicon thin film transistor, a poly-silicon thin film transistor, or the like. For example, in order to better ensure that the electrical characteristic of the first switching element 11 is substantially identical to the electrical characteristic of the second switching element 21, the first switching element 11 and the second switching element 21 can be provided adjacent to each other and use different portions of the same active layer, respectively.

For example, the first switching element 11 and the second switching element 21 may be N-type transistors, and may also be P-type transistors. For transistors of different type, the level of the control voltage of the control terminal of the transistor needs to be adjusted accordingly. For example, for an N-type transistor, the N-type transistor is in a turn-on state when the control signal is at a high level, and the N-type transistor is in a turn-off state when the control signal is at a low level. For example, for a P-type transistor, the P-type transistor is in a turn-on state when the control voltage is at a low level, and the P-type transistor is in a turn-off state when the control signal is at a high level.

For example, in one example, the first switching element 11 and the second switching element 21 may be prepared by using a low-temperature polysilicon process so that the thin film transistor has higher charge mobility and a smaller volume.

It should be noted that the first switching element 11 and the second switching element 21 may be the same, or there may be a certain difference, as long as it is ensured that the electrical characteristic of the first switching element is substantially identical to the electrical characteristic of the second switching element at the same voltage. Similarly, the first storage capacitor 12 and the second storage capacitor 22 may be the same, or there may be a certain difference, as long as it is ensured that the electrical characteristic of the first storage capacitor is substantially identical to the electrical characteristic of the second storage capacitor at the same voltage.

For example, as shown in FIG. 2A, the photoelectric detection circuit further comprises a first power terminal V1 and a second power terminal V2. A first terminal N11 of the first photoelectric sensing element 10 is electrically connected to the first power terminal V1, and a second terminal N12 of the first photoelectric sensing element 10 is electrically connected to a first terminal S1 of the first switching element 11, and a control terminal G1 of the first switching element 11 is configured to receive a first control signal, and a second terminal D1 of the first switching element 10 is electrically connected to a first terminal of the first storage capacitor 12, and a second terminal of the first storage capacitor 12 is electrically connected to the second power terminal V2.

A first terminal N21 of the second photoelectric sensing element 20 is electrically connected to the first power terminal V1, and a second terminal N22 of the second photoelectric sensing element 20 is electrically connected to a first terminal S2 of the second switching element 21, and a control terminal G2 of the second switching element 21 is configured to receive a second control signal, and a second terminal D2 of the second switching element D2 is electrically connected to a first terminal of the second storage capacitor 22, and a second terminal of the second storage capacitor 22 is electrically connected to the second power terminal V2.

For example, the first control signal is identical to the second control signal to turn on or turn off the first switching element 11 and the second switching element 21 at the same time. For example, the control terminal G1 of the first switching element 11 and the control terminal G2 of the second switching element 21 may be electrically connected to the same gate driver to receive the same control signal. However, the embodiment of the present disclosure is not limited in this aspect. For example, the control terminal G1 of the first switching element 11 and the control terminal G2 of the second switching element 21 may also be electrically connected to different gate drivers, respectively, as long as it is ensured that the first control signal is the same as the second control signal.

For example, the photoelectric detection circuit may further comprise a first power line and a second power line (not shown in the figure) to transmit voltage signals for the first power terminal V1 and the second power terminal V2, respectively.

For example, the first terminal Si of the first switching element 11 is a signal input terminal, and the second terminal D1 of the first switching element 11 is a signal output terminal; the first terminal S2 of the second switching element 21 is a signal input terminal, and the second terminal D2 of the second switching element 21 is a signal output terminal. For example, the signal input terminal can be the source electrode of the transistor for inputting the signal; the signal output terminal can be the drain electrode of the transistor for outputting the signal; the control terminal is the gate electrode of the transistor for receiving the control voltage to control the operating state of the transistor. However, considering the symmetry between the source electrode and the drain electrode of the transistor, the signal input terminal can also be the drain electrode of the transistor, and the signal output terminal can be the source electrode of the transistor. For example, for an N-type transistor, the signal input terminal is a drain electrode and the signal output terminal is a source electrode; for a P-type transistor, the signal input terminal is a source electrode and the signal output terminal is a drain electrode.

For example, the first terminal N11 of the first photoelectric sensing element 10 is a positive terminal, and the second terminal N12 of the first photoelectric sensing element 10 is a negative terminal; the first terminal N21 of the second photoelectric sensing element 20 is a positive terminal, and the second terminal N22 of the second photoelectric sensing element 20 is a negative terminal. An output voltage of the first power terminal V1 is higher than an output voltage of the second power terminal V2.

For example, the first power terminal V1 may be electrically connected to the positive electrode of the power to output a positive voltage. The second power terminal V2 may be electrically connected to the negative electrode of the power to output a negative voltage. The second power terminal V2 may also be grounded.

For another example, the first terminal N11 of the first photoelectric sensing element 10 may also be a negative terminal, and the second terminal N12 of the first photoelectric sensing element 10 is a positive terminal; in this case, the output voltage of the first power terminal V1 is lower than the output voltage of the second power terminal V2.

For example, as shown in FIG. 2A, the first sub-circuit 110 further comprises a third storage capacitor 13, and the second sub-circuit 120 further comprises a fourth storage capacitor 23. The third storage capacitor 13 is configured to hold the first control signal to a next frame so that the first switching element 11 is in a turn-on state during the entire frame period; the fourth storage capacitor 23 is configured to hold the second control signal to the next frame so that the second switching element 21 is in a turn-on state during the entire frame period.

It should be noted that in the embodiments of the present disclosure, the first sub-circuit 110 and the second sub-circuit 120 may further respectively comprise a detection transistor, a pass transistor, a reset transistor, and the like according to needs.

For example, as shown in FIG. 2A, the photoelectric detection circuit further comprises a difference circuit 30. The difference circuit 30 may be coupled to the first sub-circuit 110 and the second sub-circuit 120 to receive the first output signal Q1 output by the first sub-circuit 110 and the second output signal Q2 output by the second sub-circuit 120. The difference circuit 30 is configured to perform a difference process on the first output signal Q1 output by the first sub-circuit 110 and the second output signal Q2 output by the second sub-circuit 120, which correspond to each other.

For example, the difference circuit 30 comprises a first signal input terminal and a second signal input terminal. For example, the first signal input terminal is configured to connect to the first terminal of the first storage capacitor 12, and the second signal input terminal is configured to connect to the first terminal of the second storage capacitor 22, so the first signal input terminal can receive the first output signal Q1, and the second signal input terminal can receive the second output signal Q2.

It should be noted that a third switching element may be provided between the first signal input terminal and the first terminal of the first storage capacitor 12. When the third switching element is turned on, the difference circuit 30 can read the first output signal Q1 stored by the first storage capacitor 12. Correspondingly, a fourth switching element may be provided between the second signal input terminal and the first terminal of the second storage capacitor 22. When the fourth switching element is turned on, the difference circuit 30 can read the second output signal Q2 stored by the second storage capacitor 22.

For example, the first output signal Q1 may comprise the first electrical signal generated by the first photoelectric sensing element 10 and the dark current signal generated by other electronic components of the first sub-circuit 110; the second output signal Q2 may comprise a second electrical signal generated by the second photoelectric sensing element 20 and the dark current signal generated by other electronic components of the second sub-circuit 120.

For example, under light irradiation, the first photoelectric sensing element 10 receives incident light and generates optical-generated charge, so the first electrical signal may comprise the optical-generated charge signal of the first photoelectric sensing element 10 and the dark current signal generated by the first photoelectric sensing element 10. Because the second photoelectric sensing element 20 is shielded, no light is incident on the second photoelectric sensing element 20, so the second electrical signal may be the dark current signal generated by the second photoelectric sensing element 20.

For example, the first output signal Q1 can be expressed as follows:

$$Q_1 = f_{11} + f_{12}$$

where $f_{11}$ represents a function of the amount of the charges generated by the first photoelectric sensing element 10 with respect to light, that is, f1 involves optical-generated charges that need to be detected; $f_{12}$ represents a function of the amount of charges generated by the first sub-circuit 110 with respect to voltage, which represents the charges generated by the dark current caused by the high voltage of the electronic components of the first sub-circuit 110.

For example, the second output signal Q2 can be expressed as follows:

$$Q2 = f_{22}$$

where $f_{22}$ represents a function of the amount of charges generated by the first sub-circuit 110 with respect to voltage in the absence of light, that is, $f_{22}$ involves the charges generated by the dark current caused by the high voltage of the electronic components of the second sub-circuit 120.

At the same voltage, the electrical characteristic of the first photoelectric sensing element 10 of the first sub-circuit 110 is substantially identical to the second photoelectric sensing element 20 of the second sub-circuit 120, so $f_{12} = f_{22}$, that is, the dark current signal of the first sub-circuit 110 is the same as the dark current signal of the second sub-circuit 120; and if the electrical characteristics of the respective electronic components of the first sub-circuit 110 and the second sub-circuit 120 are substantially the same, and $f_{12} = f_{22}$ can be better ensured in practice.

The first output signal Q1 and the second output signal Q2 are input to the difference circuit 30, and go through the difference processing. For example, the second output signal Q2 is subtracted from the first output signal Q1, and the difference signal Q can be obtained:

$$Q = Q1 - Q2 = f_{11}$$

The difference signal Q is the amount of charges generated by the first photoelectric sensing element 10 under illumination. Thus, the photoelectric detection circuit can eliminate dark current in the circuit and improve detection accuracy.

Figure 3A:
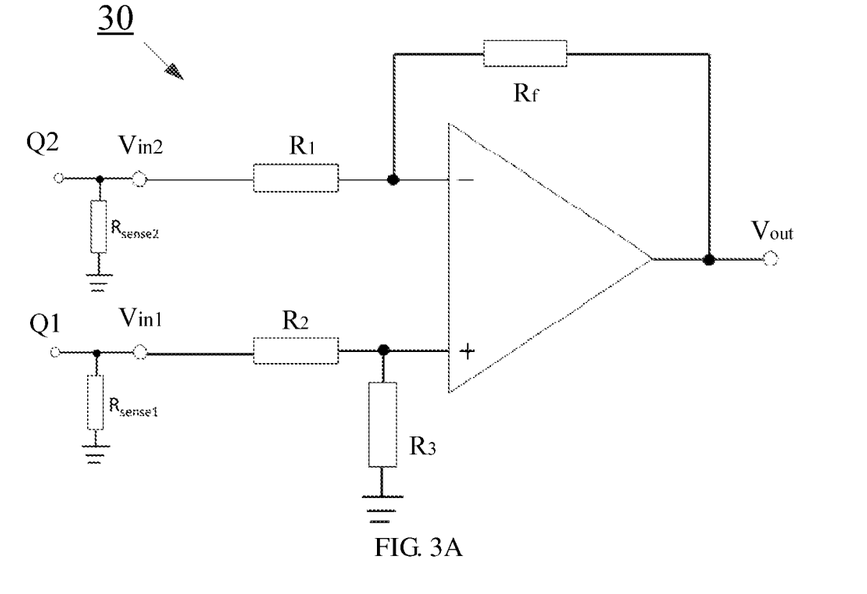
FIG. 3A is a schematic diagram of a difference circuit provided by an embodiment of the present disclosure.

For example, the difference circuit 30 can be implemented by a hardware circuit. For example, the difference circuit 30 can be constituted by elements such as transistors, resistors, capacitors, amplifiers, and the like. FIG. 3A is a schematic diagram of a difference circuit provided by an embodiment of the present disclosure.

For example, the first output signal Q1 and the second output signal Q2 are current signals. As shown in FIG. 3A, the first output signal Q1 is converted into the first voltage signal $V_{in1}$ by the first readout amplifier, and the second output signal Q2 is converted into the second voltage signal $V_{in2}$ by the second readout amplifier, and the first readout amplifier is, for example, a resistor $R_{sense1}$, and the second readout amplifier is, for example, a resistor $R_{sense2}$. A differential voltage signal $V_{out}$ can be obtained after the first voltage signal $V_{in1}$ and the second voltage signal $V_{in2}$ pass through a circuit composed of the resistors $R_1$, $R_2$, $R_3$, $R_f$, and operational amplifiers, etc., and the $V_{out}$ can be expressed as follows:

$$V_{out} = \frac{R_f}{R_1} \cdot (V_{in1} - V_{in2})$$

When the resistance of the resistor R1 is the same as the resistance of the resistor $R_f$, the difference between the first voltage signal $V_{in1}$ and the second voltage signal $V_{in2}$ can be obtained. When the resistance of the resistor $R_f$ is greater than the resistance of the resistor $R_1$, the difference circuit 30 can also amplify the electrical signal output by the photoelectric detection circuit. The difference signal Q may be the difference voltage signal $V_{out}$; or the difference voltage signal $V_{out}$ is converted back to a difference current signal, and the difference signal Q may be the difference current signal. In this way, the difference processing of subtracting the second output signal Q2 from the first output signal Q1 can be realized.

For example, a difference process of subtracting the first output signal Q1 from the second output signal Q2 can also be realized based on a similar principle.

For another example, the difference circuit 30 may also be implemented by a processor having a logic operation function, such as a field programmable gate array (FPGA), a digital signal processor (DSP), a micro controller unit (MCU), an application-specific integrated circuit (ASIC), a CPU, or the like. The difference circuit 30 may comprise, for example, a processor and a memory, and the processor reads and executes computer program instructions stored in the memory to implement the function of performing the difference process on the first output signal Q1 and the second output signal Q2.

For example, as shown in FIG. 2A, the photoelectric detection circuit further comprises an amplification circuit 31. The amplification circuit 31 may be coupled to the difference circuit 30. The difference circuit 30 is also configured to output the difference signal Q, and the amplification circuit 31 is configured to receive the difference signal Q and perform an amplification process on the difference signal Q.

For example, the signal input terminal of the amplification circuit 31 is electrically connected the signal output terminal of the difference circuit 30.

For example, the amplification circuit 31 may be a charge amplification circuit, a voltage amplification circuit, or the like. When the difference signal Q is a charge signal or a current signal, the amplification circuit 31 can convert the difference signal Q into an amplified voltage signal, and the voltage signal is proportional to the difference signal Q; when the difference signal Q is a voltage signal, the amplification circuit 31 can directly amplify the voltage signal.

Figure 3B:
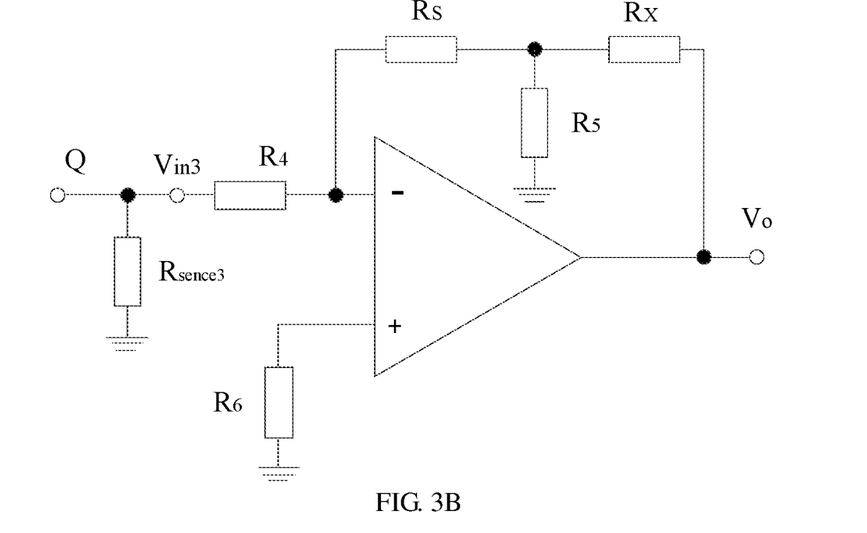
FIG. 3B is a schematic diagram of an amplification circuit provided by an embodiment of the present disclosure.

For example, the amplification circuit 31 can also be implemented by a hardware circuit. The amplification circuit 31 can be configured by elements such as transistors, resistors, capacitors, amplifiers, and the like, for example. FIG. 3B shows a schematic diagram of an amplification circuit provided by an embodiment of the present disclosure.

For example, the difference signal Q may be a current signal. As shown in FIG. 3B, the difference signal Q is converted into a third voltage signal $V_{in3}$ by a third readout amplifier, such as a resistor $R_{sense3}$. An amplified voltage signal $V_o$ is obtained after the third voltage signal $V_{in3}$ passes through a circuit composed of resistors $R_4$, $R_5$, $R_6$, $R_x$, $R_s$, an operational amplifier, and the like, and the $V_o$ can be expressed as follows:

$$V_o = -\frac{R_s}{R_1} \cdot \left(1 + \frac{R_x}{R_2}\right) \cdot V_{in3}$$

The resistance of each of the resistors of the amplification circuit 31 directly determines the amplification gain of the amplification circuit 31. By adjusting the resistances of the resistors $R_4$, $R_5$, $R_6$, $R_x$, $R_s$, the magnitude of the amplified output voltage signal $V_o$ can be adjusted.

For example, the difference signal Q may also be a voltage signal. In this case, the amplification circuit 31 may not need the third readout amplifier.

For example, the amplification circuit 31 may be a single-stage coupling amplification circuit or a multi-stage coupling amplification circuit. The amplification circuit 31 can linearly or nonlinearly transform the input signal. The linear transformation may comprise, for example, a linear function transformation or the like, and the nonlinear transformation may comprise, for example, an exponential transformation or a quadratic function transformation or the like. This embodiment is not limited in this aspect.

For example, a specific example of the amplification circuit 31 may be an electronic amplifier. The electronic amplifier may comprise, for example, an operational amplifier or the like.

For another example, the amplification circuit 31 may also be implemented by a processor having a logic operation function, such as a field programmable gate array (FPGA), a digital signal processor (DSP), a micro controller unit (MCU), an application-specific integrated circuit (ASIC), a CPU, or the like. The amplification circuit 31 may comprise, for example, a processor and a memory, and the processor reads and executes computer program instructions stored in the memory to implement the function of performing the amplification process on the difference signal Q.

For example, as shown in FIG. 2A, the first sub-circuit 110 further comprises a wavelength conversion element 15. The wavelength conversion element 15 is configured to convert incident light into the light of the wavelength in a detection wavelength band of the first photoelectric sensing element 10. The incident light may be high-frequency rays, and the high-frequency rays may comprise short-wave rays such as ultraviolet rays, X-rays, gamma rays, and the like, for example.

For example, the wavelength conversion element 15 may comprise a scintillator. The scintillator is used to absorb high-frequency rays and convert the absorbed high-frequency rays into visible light. Scintillators can be classified into, for example, inorganic scintillators and organic scintillators. The inorganic scintillators are mainly solid inorganic crystals; the inorganic scintillators are mainly crystals formed of inorganic scintillators doped with metal or rare earth impurities. For example, the material of the scintillator may comprise gadolinium oxysulfide ($Gd_2O_2S$), cesium iodide ($CsI_2$), sodium iodide (NaI), cadmium tungstate ($CdWO_4$), bismuth germanate ($Bi_4Ge_3O1_2$), amorphous selenium (a-Se), and the like.

It should be noted that the structure and the electrical characteristic of the second photoelectric sensing element 20 may be substantially identical to the structure and the electrical characteristic of the first photoelectric sensing element 10, except that the second photoelectric sensing element 20 is shielded to at least prevent light from being incident on the second photoelectric sensing element 20. Therefore, in the embodiments of the present disclosure, the related description of the structure and the electrical characteristic of the first photoelectric sensing element 10 is also applicable to the second photoelectric sensing element 20 in the case of no contradiction, and the repetition is no longer described again.

Figure 4A:
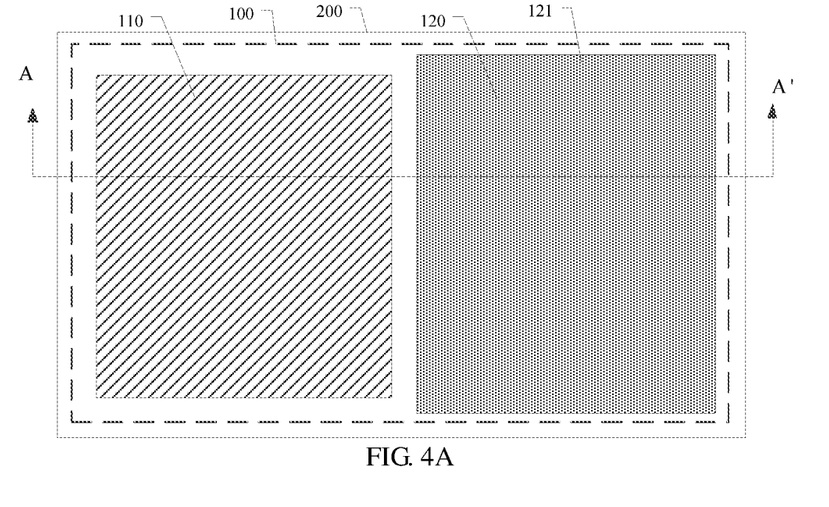
FIG. 4A is a schematic plan diagram of a photoelectric detector provided by an embodiment of the present disclosure.
Figure 4B:
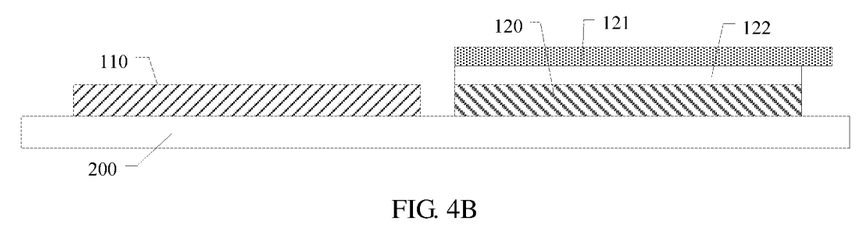
FIG. 4B is a schematic cross-sectional diagram of the photoelectric detector taken along line A-A' of FIG. 4A.
Figure 5A:
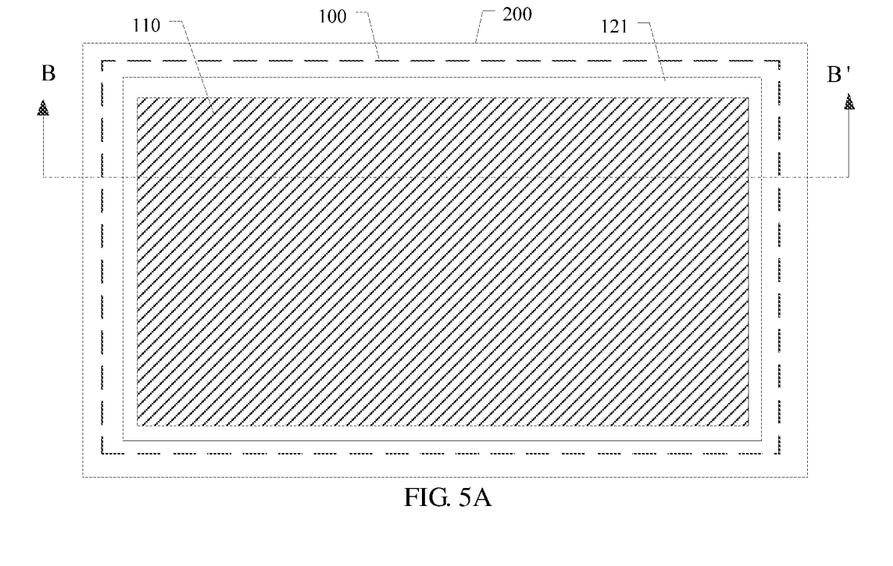
FIG. 5A is a schematic plan diagram of another photoelectric detector provided by an embodiment of the present disclosure.
Figure 5B:
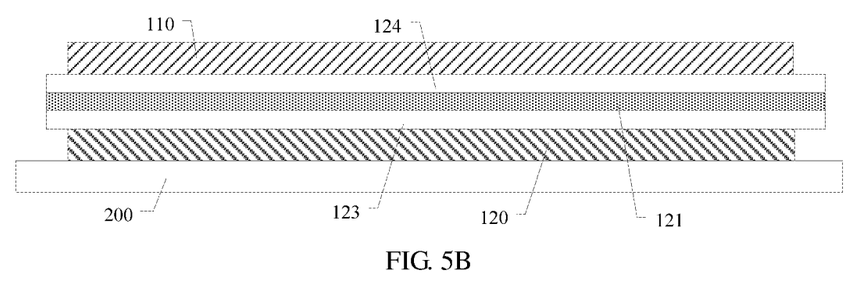
FIG. 5B is a schematic cross-sectional diagram of the photoelectric detector taken along line B-B' of FIG. 5A.

An embodiment of the present disclosure provides a photoelectric detector comprising any one of the photoelectric detection circuits described above. FIG. 4A is a schematic plan diagram of a photoelectric detector provided by an embodiment of the present disclosure; FIG. 4B is a schematic cross-sectional diagram of the photoelectric detector taken along line A-A' of FIG. 4A; FIG. 5A is a schematic plan diagram of another photoelectric detector provided by an embodiment of the present disclosure; FIG. 5B is a schematic cross-sectional diagram of the photoelectric detector taken along line B-B' of FIG. 5A.

For example, as shown in FIG. 4A, the photoelectric detector comprises a substrate 200 and at least one of the photoelectric detection circuits 100 described in any one of the above embodiments provided on the substrate 200. The photoelectric detection circuit 100 comprises a first sub-circuit 110 and a second sub-circuit 120. The first sub-circuit 110 comprises a first photoelectric sensing element, and the second sub-circuit 120 comprises a second photoelectric sensing element.

For example, as shown in FIG. 4A and FIG. 4B, in one example, the first sub-circuit 110 and the second sub-circuit 120 may be provided on a same layer, so the first sub-circuit 110 and the second sub-circuit 120 can be simultaneously formed by using the same manufacturing process. Therefore, the photoelectric detection circuit 100 provided in this example can simplify the manufacturing process and improve the yield of the photoelectric detector.

For example, in a direction perpendicular to the substrate 200, the first sub-circuit 110 does not overlap with the second sub-circuit 120. For example, the first photoelectric sensing element does not overlap with the second photoelectric sensing element at all.

For example, the photoelectric detector 100 further comprises a shading element 121. The shading element 121 covers the second photoelectric sensing element so that the light incident on the second photo-sensing element is shielded.

For example, the shading element 121 may completely cover the second sub-circuit 120 so that all the elements in the second sub-circuit 120 are in a dark state.

For example, the material of the shading element 121 may be an opaque material. The opaque material may be a metal material. For example, the metal material may comprise Mo, Cu, Al, Zn, and the like. The opaque material may also be a non-metal material. For example, the non-metal material may comprise a propylene resin incorporating a black pigment (e.g., carbon), and the like.

For example, the shading element 121 may comprise a light filter. The light filter can filter the light of the wavelength in the detection wavelength band of the second photoelectric sensing element. According to the wavelength range of the light in the detection wavelength band of the second photoelectric sensing element, the shading element 121 may comprise light filters of different type.

For example, the photoelectric detector 100 further comprises a first insulation layer 122 between the shading element 121 and the second sub-circuit 120. The first insulation layer 122 is configured to prevent a short circuit between the shading element 121 and the electronic components of the second sub-circuit 120. The first insulation layer 122 may also protect the second sub-circuit 120.

For example, as shown in FIG. 5A and FIG. 5B, in another example, the first sub-circuit 110 may also be stacked with at least part of the second sub-circuit 120, and the first sub-circuit 110 is above the second sub-circuit 120, and the light incident on the second photoelectric sensing element is shielded by the first sub-circuit 110. In the photoelectric detection circuit 100 provided by the present example, the first photoelectric sensing element may have a large photosensitive area, and can receive more incident light, thereby more detection electrical signals can be obtained, and the signal-to-noise ratio can be improved.

For example, the first sub-circuit 110 may also be stacked with at least part of the second sub-circuit 120, and the first sub-circuit 110 is above the second sub-circuit 120. For example, in a direction perpendicular to the substrate 200, the first photoelectric sensing element completely overlaps with the second photoelectric sensing element, and if the first photoelectric sensing element is opaque to light, it can shield the light incident on the second photoelectric sensing element.

For example, as shown in FIG. 5B, if the first photoelectric sensing element transmits light, the shading element 121 may be located between the first sub-circuit 110 and the second sub-circuit 120. The shading element 121 may cover the second photoelectric sensing element so that the light incident on the second photoelectric sensing element is shielded.

For example, the shading element 121 may further comprise a reflective layer, and the first photoelectric sensing element converts the incident light into an electrical signal, and if the incident light is not completely converted into the electric signal, part of the incident light that has not been converted into the electric signal may be shielded and reflected by the shading element 121, so it enters again the first photoelectric sensing element so that the first photoelectric sensing element can effectively convert the incident light signal into an electric signal, thereby detection accuracy can be improved.

For example, as shown in FIG. 5B, the photoelectric detection circuit 100 may further comprise a second insulation layer 123 and a third insulation layer 124. The second insulation layer 123 is located between the shading element 121 and the second sub-circuit 120 to prevent a short circuit between the shading element 121 and the electronic components of the second sub-circuit 120; the third insulation layer 124 is located between the shading element 121 and the first sub-circuit 110 to prevent a short circuit between the shading element 121 and the electronic components of the first sub-circuit 110.

For example, the photoelectric detector may also comprise a passivation layer (not shown in the drawings). The passivation layer is on the photoelectric detection circuit 100 to isolate the photoelectric detection circuit 100 from the outside, thereby reducing the external water and oxygen and the like which permeate into the electronic components of the photoelectric detection circuit 100, and the performance and stability of the electronic components of the photoelectric detection circuit 100 is effectively improved, and the service life of the photoelectric detection circuit 100 id prolonged.

For example, the material of the first insulation layer 122, the second insulation layer 123, and the third insulation layer 124 may be silicon nitride ($SiN_x$), silicon oxide ($SiO_x$), silicon oxynitride ($SiN_xO_y$) or other suitable materials.

For example, the substrate 200 may be a glass substrate, a quartz substrate, a ceramic substrate, a plastic substrate, a silicone substrate, or the like. For another example, the substrate 200 may also be a panel formed with functional components, and other circuits or elements may be formed on the substrate, for example.

For example, the photoelectric detector may also comprise a gate driving circuit. The gate driving circuit is configured to provide a driving signal for the photoelectric detection circuit 100 to control the photoelectric detection circuit 100 to output the detected electrical signal. For example, the gate driving circuit may output a control signal to control the turn-on or turn-off of the first switching element and the second switching element of the photoelectric detection circuit 100.

Figure 6:
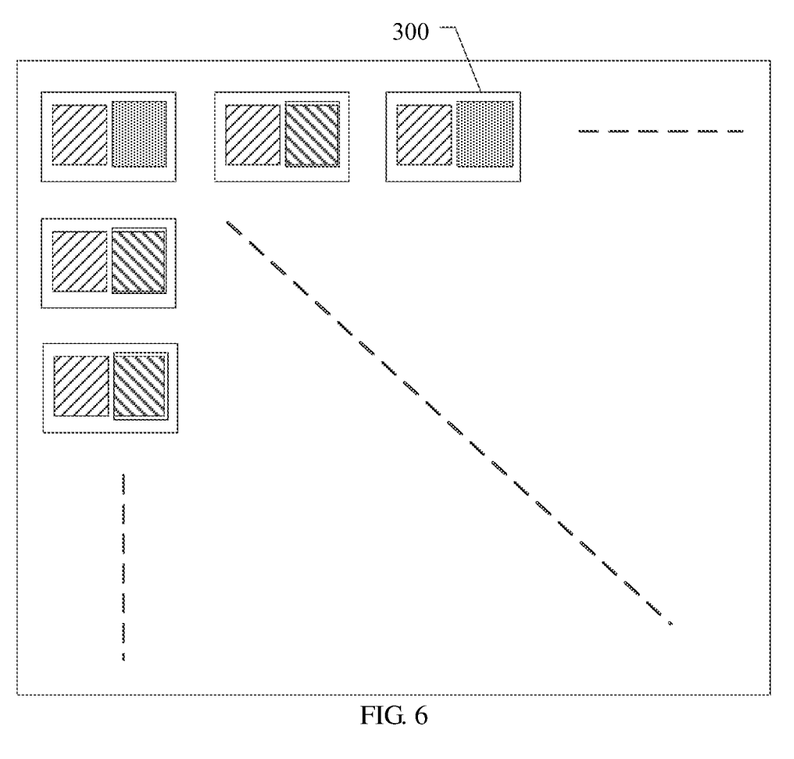
FIG. 6 is a schematic plan diagram of a photoelectric detection device provided by an embodiment of the present disclosure.

An embodiment of the present disclosure also provides a photoelectric detection device. FIG. 6 shows a schematic plan diagram of a photoelectric detection device provided by an embodiment of the present disclosure.

For example, the photoelectric detection device comprises the photoelectric detector described in any of the above embodiments. The photoelectric detector may be, for example, a visible light detector, an X-ray detector, an infrared light detector, and the like. As shown in FIG. 6, a plurality of detection units 300 in an array may be provided on the substrate of the photoelectric detector, and each of the detection units 300 comprises any one of the above mentioned photoelectric detection circuits.

For this disclosure, the following points need to be explained:

(1) The drawings of the embodiments of the present disclosure only relate to the structures involved in the embodiments of the present disclosure, and other structures may refer to the normal designs.

(2) In the case of no conflict, the embodiments of the present disclosure and the features in the embodiments can be combined with each other to obtain a new embodiment.

What are described above is related to the illustrative embodiments of the disclosure only and not limitative to the scope of the disclosure, the scopes of the disclosure are defined by the accompanying claims.

What is claimed is:

1. A photoelectric detection circuit, comprising a first sub-circuit and a second sub-circuit,
   wherein the first sub-circuit comprises a first photoelectric sensing element, and the second sub-circuit comprises a second photoelectric sensing element;
   an electrical characteristic of the first photoelectric sensing element is substantially identical to an electrical characteristic of the second photoelectric sensing element, and the second photoelectric sensing element is shielded to prevent light from being incident on the second photoelectric sensing element; and the second photoelectric sensing element is shielded by the first photoelectric sensing element to prevent the light from being incident on the second photoelectric sensing element.

2. A photoelectric detector comprising at least one photoelectric detection circuit according to claim 1.

3. The photoelectric detection circuit according to claim 1, further comprising a difference circuit coupled to the first sub-circuit and the second sub-circuit, wherein the difference circuit is configured to perform a difference processing on a first output signal output by the first sub-circuit and a second output signal output by the second sub-circuit corresponding to each other.

4. The photoelectric detection circuit according to claim 3, further comprising an amplification circuit coupled to the difference circuit, wherein the difference circuit is further configured to output a difference signal, and the amplification circuit is configured to receive the difference signal and perform an amplification processing on the difference signal.

5. The photoelectric detection circuit according to claim 1, wherein the second photoelectric sensing element is shielded to prevent light of a wavelength at least in a detection wavelength band of the second photoelectric sensing element from being incident on the second photoelectric sensing element.

6. The photoelectric detection circuit according to claim 1, wherein the first sub-circuit further comprises a first switching element and a first storage capacitor, and the first switching element is configured to control and output a first electrical signal generated by the first photoelectric sensing element, and the first storage capacitor is configured to store the first electrical signal, and the second sub-circuit further comprises a second switching element and a second storage capacitor, and the second switching element is configured to control and output a second electrical signal generated by the second photoelectric sensing element, and the second storage capacitor is configured to store the second electrical signal.

7. The photoelectric detection circuit according to claim 6, further comprising a first power terminal and a second power terminal, wherein a first terminal of the first photoelectric sensing element is electrically connected to the first power terminal, and a second terminal of the first photoelectric sensing element is electrically connected to a first terminal of the first switching element, and a control terminal of the first switching element is configured to receive a control signal, and a second terminal of the first switching element is electrically connected to a first terminal of the first storage capacitor, and a second terminal of the first storage capacitor is electrically connected to the second power terminal;

a first terminal of the second photoelectric sensing element is electrically connected to the first power terminal, and a second terminal of the second photoelectric sensing element is electrically connected to a first terminal of the second switching element, and a control terminal of the second switching element is configured to receive the control signal, and a second terminal of the second switching element is electrically connected to a first terminal of the second storage capacitor, and a second terminal of the second storage capacitor is electrically connected to the second power terminal.

8. The photoelectric detection circuit according to claim 7, wherein the first terminal of the first photoelectric sensing element is a positive terminal, and the second terminal of the first photoelectric sensing element is a negative terminal, and the first terminal of the second photoelectric sensing element is a positive terminal, and the second terminal of the second photoelectric sensing element is a negative terminal, and an output voltage of the first power terminal is higher than an output voltage of the second power terminal.

9. The photoelectric detection circuit according to claim 6, wherein an electrical characteristic of the first switching element is substantially identical to an electrical characteristic of the second switching element, and an electrical characteristic of the first storage capacitor is substantially identical to an electrical characteristic of the second storage capacitor.

10. The photoelectric detection circuit according to claim 1, wherein the first photoelectric sensing element comprises a first photodiode, and the second photoelectric sensing element comprises a second photodiode.

11. The photoelectric detection circuit according to claim 1, wherein the first sub-circuit further comprises a wavelength conversion element, and the wavelength conversion element is configured to convert incident light into light of the wavelength in a detection wavelength band of the first photoelectric sensing element.

12. The photoelectric detection circuit according to claim 1, further comprising a shading element, wherein the shading element covers the second photoelectric sensing element so that the light incident on the second photoelectric sensing element is shielded.

13. A photoelectric detection circuit, comprising a first sub-circuit and a second sub-circuit, wherein the first sub-circuit comprises a first photoelectric sensing element, and the second sub-circuit comprises a second photoelectric sensing element;

an electrical characteristic of the first photoelectric sensing element is substantially identical to an electrical characteristic of the second photoelectric sensing element, and the second photoelectric sensing element is shielded to prevent light from being incident on the second photoelectric sensing element;

the photoelectric detection circuit further comprises a shading element:

the first sub-circuit is stacked with the second sub-circuit, and the first sub-circuit is above the second sub-circuit; and the shading element is located between the first sub-circuit and the second sub-circuit, and covers the second photoelectric sensing element so that the light incident on the second photoelectric sensing element is shielded.

14. A photoelectric detector comprising at least one photoelectric detection circuit, wherein the photoelectric detection circuit comprises a first sub-circuit and a second sub-circuit;

the first sub-circuit comprises a first photoelectric sensing element, and the second sub-circuit comprises a second photoelectric sensing element;

an electrical characteristic of the first photoelectric sensing element is substantially identical to an electrical characteristic of the second photoelectric sensing element, and the second photoelectric sensing element is shielded to prevent light from being incident on the second photoelectric sensing element; and the first sub-circuit is stacked with the second sub-circuit, and the first sub-circuit is above the second sub-circuit, and so that the light incident on the second photoelectric sensing element is shielded by the first sub-circuit.

15. The photoelectric detector according to claim 2, further comprising a shading element, wherein the first sub-circuit is stacked with the second sub-circuit, and the first sub-circuit is above the second sub-circuit, and wherein the shading element is located between the first sub-circuit and the second sub-circuit, and covers the second photoelectric sensing element so that the light incident on the second photoelectric sensing element is shielded.

* * * * *